United States Patent Office 2,936,218
Patented May 10, 1960

2,936,218

RECONSTITUTED SYNTHETIC MICA AND ITS PROCESS OF MAKING

William McNeill, Philadelphia, Pa., and Hans B. Jonassen, New Orleans, La., assignors to United States of America as represented by the Secretary of the Army No Drawing. Application October 23, 1957
Serial No. 692,012

4 Claims. (Cl. 23—110)

(Granted under Title 35, U.S. Code (1952), sec. 266)

The invention described herein may be manufactured and used by or for the Government for governmental purposes without the payment of any royalty thereon.

This invention relates to a reconstituted synthetic mica and its process of making and has for an object to provide such a material having characteristics better adapting it for use as the dielectric between the plates of an electrical condenser, especially in resistance to breakdown, dielectric constant, freedom from impurities, nonporosity, and other properties.

Because the natural mica in large sheets is found in quantity today only outside the United States, efforts have been made to synthesize a mica substitute for the natural product. One such was devised by the Bureau of Mines but was open to the disadvantage that the sheets were too small for some of the desired uses. Another substitute was devised by following the practice of the paper mill industry and this was found objectionable by being too porous for use as the dielectric in aircraft ignition condensers and not satisfactory as spacers in vacuum tubes. What has been needed is a substitute combining the characteristics of natural mica in possessing outstanding resistance to thermal and dielectric breakdown.

According to the present invention, a fluor phlogopite is wet ground in preferably an anhydrous Tergitol TD and anisole. Tergitol TD is a tetradecyl alcohol condensed with ethylene oxide. More specifically 10 grams of Tergitol TD are mixed with 100 cc. of anisole, i.e., phenyl methyl ether and ground up by hand or in a ball mill with 10 grams of the fluor phlogopite until the latter has a particle size between about $10^{-3}$ to $10^{-5}$ centimeters. Best results have been obtained with the foregoing liquid, for the grinding. Next in preference 75 grams of the fluor phlogopite and 300 cc. of pure anhydrous isopropyl alcohol were ball milled for 64 hours to obtain the above particle size. Other liquids for the wet grinding operation include the following pure anhydrous alcohols: isobutyl or isoamyl or n-amyl, or caprylic, or 2 ethyl hexyl alcohol. The first two mentioned are preferred because of the deposit. The grinding is done in substantially anhydrous media because water in the final suspension leads to electrolysis and undesirable electrode products. The quantities of synthetic mica and isopropyl alcohol used in the grinding operation are so chosen as to give efficient grinding. The product of the grinding operation is too concentrated to give a controllably slow electrophoretic deposition rate and accordingly is diluted to four times its volume with more anhydrous isopropyl alcohol.

After dilution the suspension is subjected to an electric field between about 100 volts and about 1,000 volts between a pair of spaced electrodes immersed in the suspension. A very small current flows and coatings up to 60 mils thick can be deposited in 20 seconds. The particles are probably deposited flatwise on an electrode in a pure condition inasmuch as the electrophoretic deposition does not cause impurities to be deposited as might be the case with other types of deposition. Usually a less thick coating of the reconstituted mica is desired around 2 to 5 mils in thickness. This process is electrokinetic and the particles of the size mentioned are deposited rapidly.

After deposition of a layer of the fluor phlogopite or synthetic mica the coating and electrode are withdrawn and dried. Then they are inserted in a furnace at a temperature of about 2400° F. to 2600° F. (1318° C. to 1426° C.) for less than a minute. The decomposition temperature of the layer is around 2370° F. (1300° C.). This higher heat for a short time is believed effective in reconstituting the particles in a manner analogous to sintering, at least in unifying them into a continuous layer. The layer and its electrode may then be subjected to a heat below the decomposition temperature, about 2100° F. (1150° C.) for around an hour more or less. This is for the purpose of allowing an opportunity for grain growth of the crystals. This step is optional.

Subsequently the reconstituted film of synthetic mica is allowed to cool and in so doing usually loosens itself from the electrode to which it had been attached. Investigation has not disclosed the cause of such loosening of the film or coat from its electrode. Perhaps it is due to a different temperature coefficient of expansion and contraction for the coat as compared with the electrode. The electrode had preferably been an alloy of platinum, or palladium, and ruthenium.

The deposition is helped by and seems to increase the compactness of the deposited film with agitation of the liquid. Such may be by manual or mechanical or electrical and sonic or ultrasonic vibrations. Before raising the temperature of the film to the maximum it has been found to be desirable to raise its temperature to around 1000° F. for about a minute to remove organic materials, thereby apparently removing impurities which would otherwise be deleterious to the electrical characteristics. Heating to the higher temperature is preferably in potassium fluoride vapor to reduce the loss of fluoride and the transformation into Forsterite ($Mg_2SiO_4$).

The finished product is a film which is clear and nonporous, which appears amorphous in X-ray analysis, but yet when viewed in a polarizing microscope possesses the same crystal habit as natural mica. However, the optical extinctions distinguish this reconstituted material from the synthetic fluor phlogopite that was the starting material in this process. The X-ray results distinguish the product of this invention from Forsterite or humite or any of the crystalline decomposition products of synthetic mica. Glass appears amorphous under X-rays and also under the polarizing microscope. The dielectric breakdown of this material occurred with 800 to 1000 volts per mil under ASTM test B–110–45.

Among the advantages of this product may be included: (1) Because only the fluor phlogopite particles are responsive to the electric field, impurities are not moved to be deposited. (2) Higher density deposits result than by prior art processes for making pure synthetic mica, and high density means greater freedom from objectionable pores in the material. (3) The particles may be oriented in being deposited so that these particles are all arranged in parallelism. This may be the reason why the present product has better resistance to a breakdown voltage than does the prior art product made by the paper making technique. (4) Rapidity in deposition is an important feature. (5) Coatings can be made to various shapes. Epitomized, this invention produces a product which is the closest approach to a combination of the two most desirable characteristics namely a high breakdown voltage being necessary for puncture and desirable thermal properties. This product has substantially less than 5% porosity unlike the pure reconstituted micas.

We claim:

1. A process for producing an insulating material from synthetic mica, having a high breakdown voltage characteristic in combination with resistance to high temperatures, said process comprising wet grinding a mineral crystal known as synthetic fluor phlogopite, in at least one substantially anhydrous member of the group consisting of isopropyl alcohol, isobutyl alcohol, isoamyl alcohol, n-amyl alcohol, 2-ethyl hexyl alcohol, and a reaction product of tetradecyl alcohol condensed with several moles of ethylene oxide with anisole to produce a wet mass having a particle size of about $10^{-3}$ to $10^{-5}$ centimeters, diluting the wet ground material to about 4 times its initial volume, forming an electrophoretic deposit of reconstituted mica on a metal electrode from which the deposit will be separated after heating as hereinafter mentioned, said deposit being formed by a migration of reconstituted mica particles under the influence of an electric field whereby a coating up to about 60 mils in thickness may be formed in about 20 seconds, separating the deposit and electrode on which formed, from the liquid in which the deposition of particles occurred, drying said coating, heating said coating and its electrode to around 2400° F. to 2600° F. for a time of the order of a minute, subsequently cooling the coating and electrode, and separating the coating from its electrode.

2. A process for producing an insulating material from synthetic mica, having a high breakdown voltage characteristic in combination with resistance to high temperatures, said process comprising wet grinding a mineral crystal known as synthetic fluor phlogopite, in at least one substantially anhydrous member of the group consisting of isopropyl alcohol, isobutyl alcohol, isoamyl alcohol, n-amyl alcohol, 2 ethyl hexyl alcohol, and a reaction product of tetradecyl alcohol condensed with several moles of ethylene oxide with anisole to produce a wet mass having a particle size of about $10^{-3}$ to $10^{-5}$ centimeters, diluting the wet ground material to about 4 times its initial volume, forming an electro-phoretic deposit of reconstituted mica on a metal electrode from which the deposit will be separated after heating as hereinafter mentioned, said deposit being formed by a migration of reconstituted mica particles under the influence of an electric field whereby a coating up to about 60 mils in thickness may be formed in about 20 seconds, separating the deposit and electrode on which formed, from the liquid in which the deposition of particles occurred, drying said coating, heating said coating and its electrode to around 2400° F. to 2600° F. for a time of the order of a minute, then reducing the temperature to around 2100° F. for a time of the order of an hour to facilitate crystal growth, subsequently cooling the coating and electrode, and separating the coating from its electrode.

3. A process for producing a reconstituted synthetic fluor phlogopite mica non-porous electrical insulating layer having high temperature resistance and a high voltage breakdown characteristic which comprises wet grinding a fluor phlogopite in a substantially anhydrous reaction product of a tetradecyl alcohol condensed with several moles of ethylene oxide and with anisole, diluting the wet ground material to facilitate control of the rate at which the wet ground material is deposited, depositing a layer of the reconstituted mica material on an electrode by electrophoresis, drying said material, heating the same for less than a minute at a temperature above that at which the material decomposes and separating the same from an electrode on which formed.

4. A process for producing a reconstituted synthetic fluor phlogopite mica non-porous electrical insulating layer having high temperature resistance and a high voltage breakdown characteristic which comprises wet grinding a fluor phlogopite in a substantially anhydrous reaction product of a tetradecyl alcohol condensed with several moles of ethylene oxide and with anisole, diluting the wet ground material to facilitate control of the rate at which the wet ground material is deposited, depositing a layer of the reconstituted mica material on an electrode by electrophoresis, drying said material, heating the same for not more than a minute at a temperature above that at which the material decomposes, reducing the temperature to below the decomposition temperature of the material and holding it at said lower temperature, and separating the same from an electrode on which formed.

References Cited in the file of this patent

UNITED STATES PATENTS

| | | |
|---|---|---|
| 2,704,105 | Robinson et al. | Mar. 15, 1955 |
| 2,788,837 | Barr | Apr. 16, 1957 |

FOREIGN PATENTS

| | | |
|---|---|---|
| 984,969 | France | July 12, 1951 |